(12) United States Patent
Seo (10) Patent No.: US 11,162,540 B2
(45) Date of Patent: Nov. 2, 2021

(54) CONNECTION DEVICE FOR AGRICULTURAL MACHINE

(71) Applicant: HAEDONGAGK CO., LTD., Jeollanam-do (KR)

(72) Inventor: Kyoung Jin Seo, Jeollanam-do (KR)

(73) Assignee: HAEDONGAGK CO., LTD., Jeollanam-do (KR)

( * ) Notice: Subject to any disclaimer, the term of this patent is extended or adjusted under 35 U.S.C. 154(b) by 473 days.

(21) Appl. No.: 16/314,303

(22) PCT Filed: Dec. 5, 2017

(86) PCT No.: PCT/KR2017/014162
§ 371 (c)(1),
(2) Date: Dec. 28, 2018

(87) PCT Pub. No.: WO2019/059457
PCT Pub. Date: Mar. 28, 2019

(65) Prior Publication Data
US 2021/0222738 A1 Jul. 22, 2021

(30) Foreign Application Priority Data
Sep. 21, 2017 (KR) .......................... 10-2017-0122076

(51) Int. Cl.
*F16D 3/40* (2006.01)
*A01B 71/06* (2006.01)
(Continued)

(52) U.S. Cl.
CPC ................ *F16D 3/40* (2013.01); *A01B 71/06* (2013.01); *A01B 71/066* (2013.01); *B60K 17/28* (2013.01);
(Continued)

(58) Field of Classification Search
CPC ..... F16D 3/40; F16D 3/32; F16D 1/10; F16D 2001/103; A01B 71/066; A01B 71/06; B60K 17/28
(Continued)

(56) References Cited

U.S. PATENT DOCUMENTS

| 806,592 A | * | 12/1905 | Spicer | 464/117 |
| 1,455,493 A | * | 5/1923 | John | A01B 71/06 180/53.1 |
| 9,228,614 B2 | * | 1/2016 | Lee | F16D 3/32 |

FOREIGN PATENT DOCUMENTS

| DE | 1 117 950 | * 11/1961 | .................... 464/117 |
| JP | 2-309016 A | * 12/1990 | |

(Continued)

OTHER PUBLICATIONS

Universal Joint and Driveshaft Design Manual, AE-7, Society of Automotive Engineers, Inc., Warrendale, PA, Section 3.2.2. TJ1079 .S62. (Year: 1979).*

*Primary Examiner* — Greg Binda
(74) *Attorney, Agent, or Firm* — Rabin & Berdo, P.C.

(57) ABSTRACT

A connection device for an agricultural machine includes a front having an input shaft coupled with an input yoke and installed passing therethrough, a rear body having an output shaft coupled with an output yoke and installed passing therethrough, a joint part provided to allow each of the bodies to be coupled with each other and to be rotatable via center pins installed on central parts of upper and lower tip ends of each of the bodies, and a connection yoke fastening each of the input and output yokes thereto via cross-shaped bearings. In the cross-shaped bearings, a length (L) of the connection yoke fastening shafts fastened to the connection yoke is formed to be longer than the length (l) of the input and output connection yoke fastening shafts fastened to the input and output yokes.

10 Claims, 11 Drawing Sheets

(51) Int. Cl.
  *B60K 17/28* (2006.01)
  *F16D 1/10* (2006.01)
  *F16D 3/32* (2006.01)

(52) U.S. Cl.
  CPC ............... *F16D 1/10* (2013.01); *F16D 3/32* (2013.01); *F16D 2001/103* (2013.01)

(58) Field of Classification Search
  USPC ............................... 464/117, 136; 180/53.1
  See application file for complete search history.

(56) References Cited

FOREIGN PATENT DOCUMENTS

| KR | 20-2000-0018046 U | 10/2000 |
| KR | 10-2008-0056437 A | 6/2008 |
| KR | 20-2009-0007111 U | 7/2009 |
| KR | 20-2011-0005871 U | 6/2011 |
| KR | 10-1401024 B1 | 5/2014 |

* cited by examiner

FIG. 1

(BACKGROUND ART)

FIG. 2

(BACKGROUND ART)

(BACKGROUND ART)

CONNECTION DEVICE FOR AGRICULTURAL MACHINE

TECHNICAL FIELD

The present invention relates generally to a connection device for an agricultural machine and, more particularly, to a connection device for an agricultural machine connecting a tractor to the agricultural machine safely and firmly, while safely transmitting power of the tractor to the agricultural machine and enlarging the rotation angle of the connection device, thereby facilitating the tractor and the agricultural machine to enter into and exit from arable land from a road, as well as allowing even a corner area of a rice paddy or field (arable land) to be worked by the tractor and the agricultural machine.

BACKGROUND ART

Generally, a connection device for an agricultural machine is to connect a desired agricultural machine to a rear side of a tractor or tiller and to transmit power of the tractor or tiller to the connected agricultural machine, thereby playing a role in enabling the agricultural machine to perform desired work.

Figure 1:
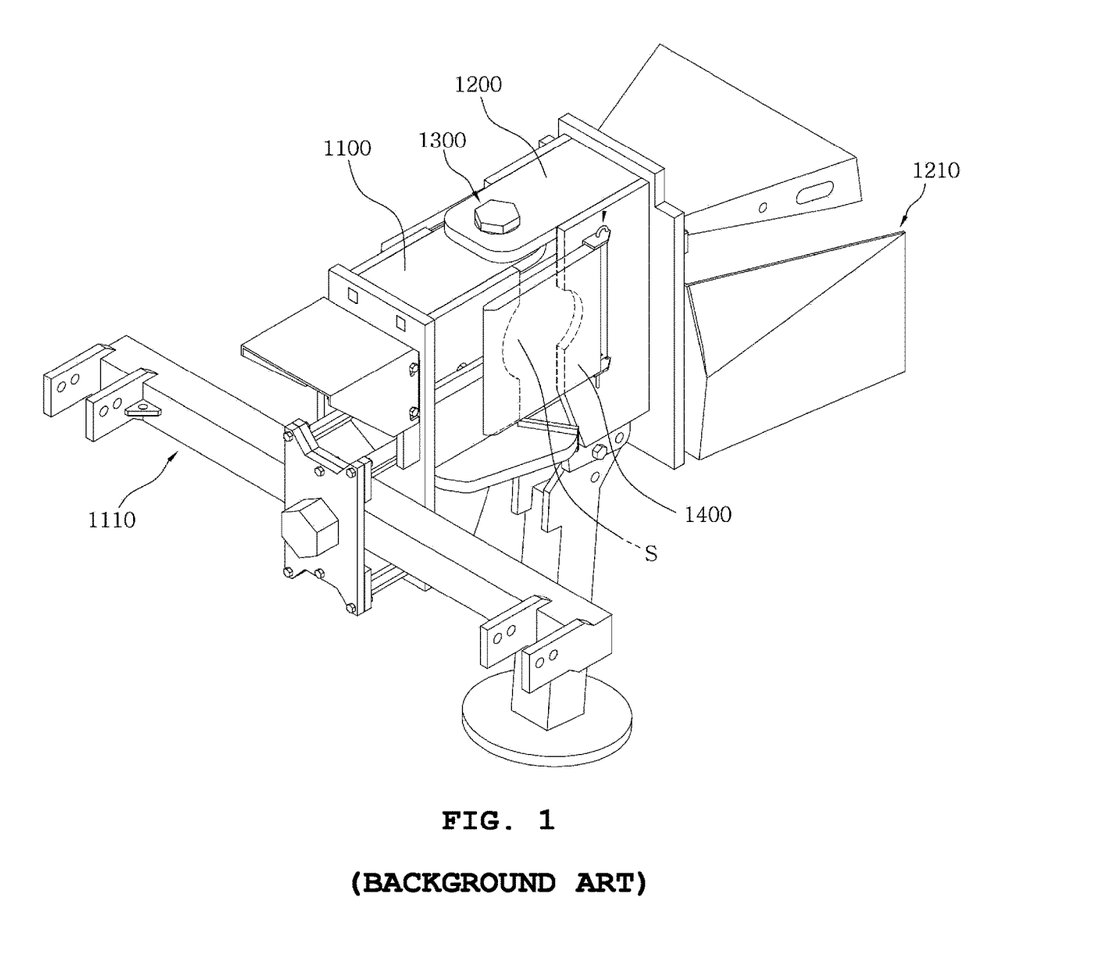
FIG. 1 is a perspective view illustrating a connection device for a farm working machine of a conventional first embodiment.

The connection device for the agricultural machine having the above-mentioned function has been disclosed as "Connection Device of Tractor and Farm Working Machine" of Korean Patent No. 10-1401024 having a safety cover as shown in FIG. 1 invented and registered by the applicant, and the configuration of the connection device is described as in "The next" below.

—The Next—

A front body 1100 is provided at one side with a tractor connection means 1110 connected to a rear of the tractor; a rear body 1200 is provided at other side with a farm working machine connection means 1210 connected to the farm working machine at the other side; a joint part 1300 is formed to allow the front and rear bodies to be rotated to both of the left and right sides, wherein upper and lower end parts of the front and rear bodies facing each other are connected in an overlapped state to each other; a power transmitting means to transmit the power of the tractor to the farm working machine in the horizontal and even refracted states passes through the front and rear bodies and is positioned therein; a space S is secured at the central portions of both side surfaces of the front and rear bodies for repairing when the lubricant is not supplied by the power transmission means or the power transmission means is broken; and a safety cover device 1400 to prevent intrusion of a foreign substance is installed over the space S, wherein the primary purpose of the safety cover device 1400 is to prevent the foreign substance from entering into the space S.

Figure 2:
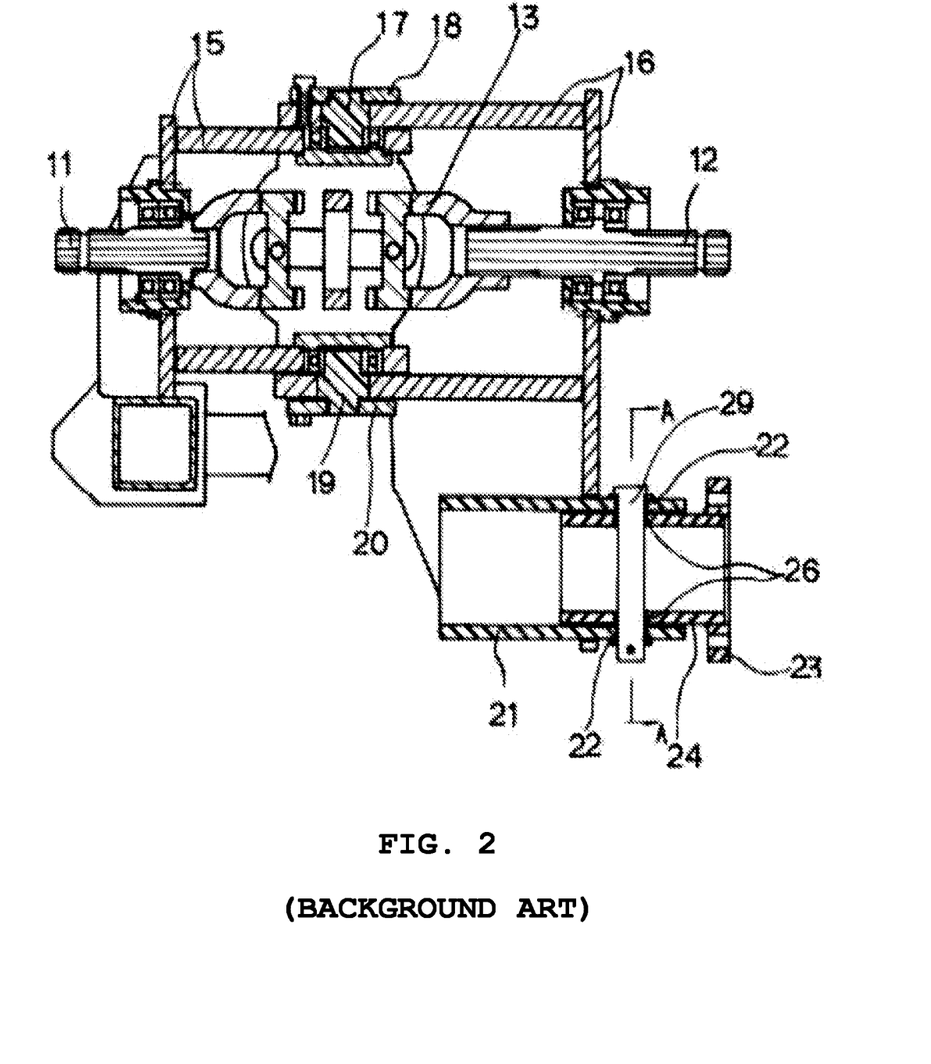
FIG. 2 is a cross sectional view illustrating a connection device for a farming machine according to a conventional second embodiment.

In addition, the conventional connection device for farming machine is one such as "Connection Device for Farming Machine" of Korean Utility Model Application Publication No. 20-2000-0018046 as illustrated in FIG. 2, and the configuration of the connection device is described as in "The next" below.

— The Next —

The connection device for a farming machine is configured to include a power input shaft 11 connected to agricultural heavy equipment at one side and a power output shaft 12 connected to a farming machine at other side, wherein the power input shaft 11 and the power output shaft 12 are connected to each other by a universal joint 13. Meanwhile the power input shaft supporting body 15 and the power output shaft supporting body 16 are connected to each other to be freely rotatable to the left and right by upper and lower rotating shafts 17 and 19 and rotating shaft shrouds 18 and 20.

In addition, a fixed end pipe 21 is integrally fixed to a lower portion of the power output shaft supporting body 16, wherein long holes 22 are each formed on top and bottom portions of the fixed end pipe 21, and a movable end pipe 24 attached with a fastening plate 23 at one end thereof is inserted into the fixed end pipe 21. Then, the connection pin 29 is inserted into the holes 26 formed on top and bottom portions of the movable end pipe 24 and the upper and lower long holes 22 of the fixed end pipe 21. Then, split pin is inserted into the connection pin 29 and the fixed end pipe 21 and the movable end pipe 24 are matched with each other.

The above-described conventional farming machine connection device safely transmits the power of a tractor or the like to a farming machine so that the farming machine performs a desired operation. In this case, since the rotation angle of the connection device is within 52 degree angles, the farming machine may not be allowed to access to a corner area of a rice paddy or a field (arable land), thereby creating a problem of a large remaining portion of the field to be manually cultivated.

DISCLOSURE

Technical Problem

Accordingly, the present invention has been made keeping in mind the above problems occurring in the related art, and the purposes of the present invention are as follows.

First, the rotation angle of the connection device connecting the tractor and the agricultural machine is enlarged, thereby facilitating the tractor and the agricultural machine to enter and exit from arable land from and to a road, as well as, thereby allowing even deep area of a corner of a rice paddy or field (arable land) to be worked by the tractor and the agricultural machine.

Second, the power of the tractor can be smoothly transmitted to the agricultural machine even when the rotation angle of the connecting device is enlarged.

Third, the tractor is allowed to pull up the agricultural machine smoothly even when the rotation angle of the connection device is enlarged and, at the same time, to enhance the durability thereof.

Technical Solution

In order to accomplish the above object, the present invention provides a connection device for an agricultural machine.

The connection device for an agricultural machine may include: a front body 100 having an input shaft (400) coupled with an input yoke 410 and installed passing therethrough;

a rear body 200 having an output shaft 500 coupled with an output yoke 510 and installed passing therethrough; a joint part 300 provided to allow each of the bodies to be coupled with each other and to be rotatable via center pins 310 installed on central parts of upper and lower tip ends of each of the bodies; and a connection yoke 700 fastening each of the input and output yokes 410 and 510 thereto via cross-shaped bearings 600.

In the cross-shaped bearings 600, a length L of the connection yoke fastening shafts 610 fastened to the connection yoke 700 is formed to be longer than the length 1 of the input and output connection yoke fastening shafts 620 fastened to the input and output yokes 410 and 510, and an outer diameter R of a tip end of each of the input and output yokes 410 and 510 is formed to be smaller than an inner diameter r of an entrance of the connection yoke 700, whereby, when each of the input and output yokes 410 and 510 rotates, a part of the tip end of each of the input and output yokes 410 and 510 can be easily rotated without friction in a state of being accommodated in an inner side of the entrance of the connection yoke 700 and, at the same time, a rotation angle of the input and output yokes 410 and 510 is allowed to be enlarged.

In addition, the connection yoke 700 is formed with a ring portion 710 at a center thereof, and a pair of fastening holes 720 integrally formed with the ring portion 710 are protrudingly formed on each of opposite sides, of the ring portion 710 so as to face each other, wherein an inner circumferential surface of the ring portion 710 is formed such that the inner diameter thereof gradually becomes smaller from the entrance toward the central portion of the inner side thereof.

In addition, a pair of input yoke shaft fastening portions 412 fastening the input yoke fastening shaft 620 thereto are formed to face each other in a forward direction of the input yoke 410, and an input shaft coupling portion 411 having a spline gear formed on an inner circumferential surface thereof in a rearward direction of the input yoke 410 so as to be coupled with an input shaft 400 having a spline gear formed thereon in a forward direction thereof, and a pair of output yoke shaft fastening portions 512 fastening the output yoke fastening shaft 620 thereto are formed to face each other in a forward direction of the output yoke 510, and an output shaft coupling portion 511 having a spline gear formed on an inner circumferential surface thereof in a rearward direction of the output yoke 510 so as to be coupled with an output shaft 500 having a spline gear formed thereon in a forward direction thereof.

In addition, a length A of the input shaft coupling unit 411 formed in a rearward direction of the input yoke 410 is formed longer than a length a of the output shaft coupling unit 511 formed in a rearward direction of the output yoke 510. In addition, a rotation angle of the front and rear bodies 100 and 200 is preferably 75 degree angles or less to both of left and right sides with the center line as a reference.

In addition, a rotation angle adjusting means 800 for adjusting the body rotation angle of the other side is installed on opposite end parts of the lower portion of either one of the front and rear bodies 100 and 200. In addition, the rotation angle adjusting means 800 is configured to include: a stopper 810 installed at each of opposite sides of the lower portion of either one of the front and rear bodies 100 and 200; and a rotating body 830 installed at a tip end of the stopper 810 and rotated via a hinge axle 820 installed at an innermost side thereof; and a fixing means 840 provided at the stopper 810 and the rotating body 830 and fixing a position of the rotating body 830.

In addition, the fixing means 840 is configured to include: through holes 841 formed at regular intervals in any one of the rotating body 830 and the stopper 810; coupling holes 842 formed to be corresponding to the through holes 841 in the remaining one of the rotating body 830 and the stopper 810; and fixing members 843 passing through the through holes and coupling holes correspondingly as necessary and provided at a position adjacent to the through holes and coupling holes. In addition, the fixing means 840 is formed in a plurality.

In addition, in the cross-shaped bearing 600, an outer diameter t of the input and output yoke fastening shafts 620 fastened to the respective input and output yokes 410 and 510 is formed to be larger than an outer diameter T of the coupling yoke fastening shafts 610 fastened to the connection yoke 700.

Advantageous Effects

Configured as described above, the connection device for the agricultural machine of the present invention can enlarge the magnitude of the rotation angle of the connection device connecting the tractor and the agricultural machine to each other to facilitate the tractor and the agricultural machine to enter into and exit from arable land from and to the road, thereby allowing even a corner area of a rice paddy or field (arable land) to be worked by the tractor and the agricultural machine. Accordingly, there are effects such that the remaining portion to be worked manually minimized, the power of the tractor can be smoothly transmitted to the agricultural machine even when the rotation angle of the connecting device is enlarged, and the tractor is allowed to pull up the agricultural machine smoothly even when the rotation angle of the connection device is enlarged and, at the same time, to enhance the durability thereof.

BEST MODE

A connection device for an agricultural machine according to the present invention can safely and firmly connect a tractor and the agricultural machine, while safely transmitting power of the tractor to the agricultural machine and enlarging a rotation angle of the connection device to work a corner area of a rice paddy or field. Hereinbelow, exemplary embodiments of the present invention will be described in detail as in "The next" below with reference to the accompanying drawings. Throughout the drawings, the same reference numerals will refer to the same or like parts.

—The Next—

Figure 3:
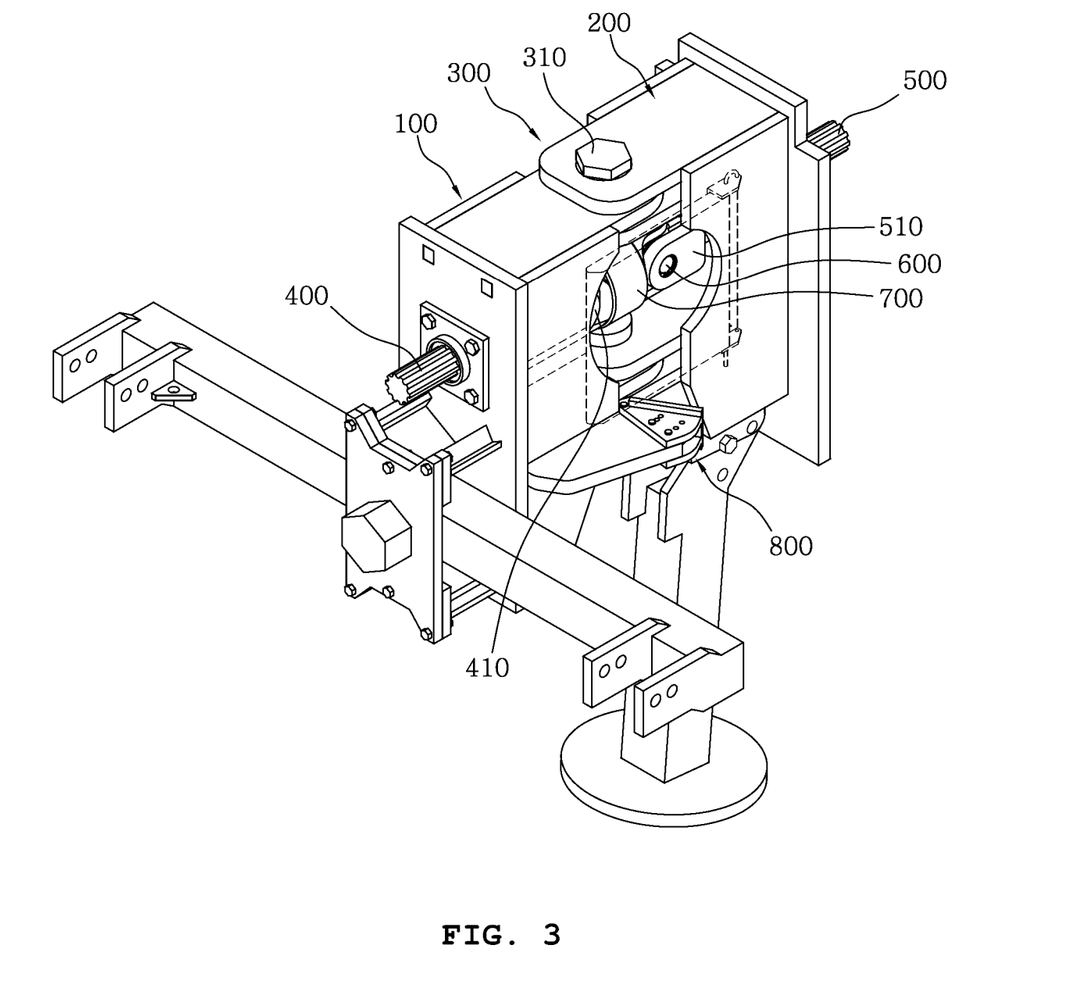
FIG. 3 is a perspective view illustrating a connection device for an agricultural machine of the present invention.
Figure 4:
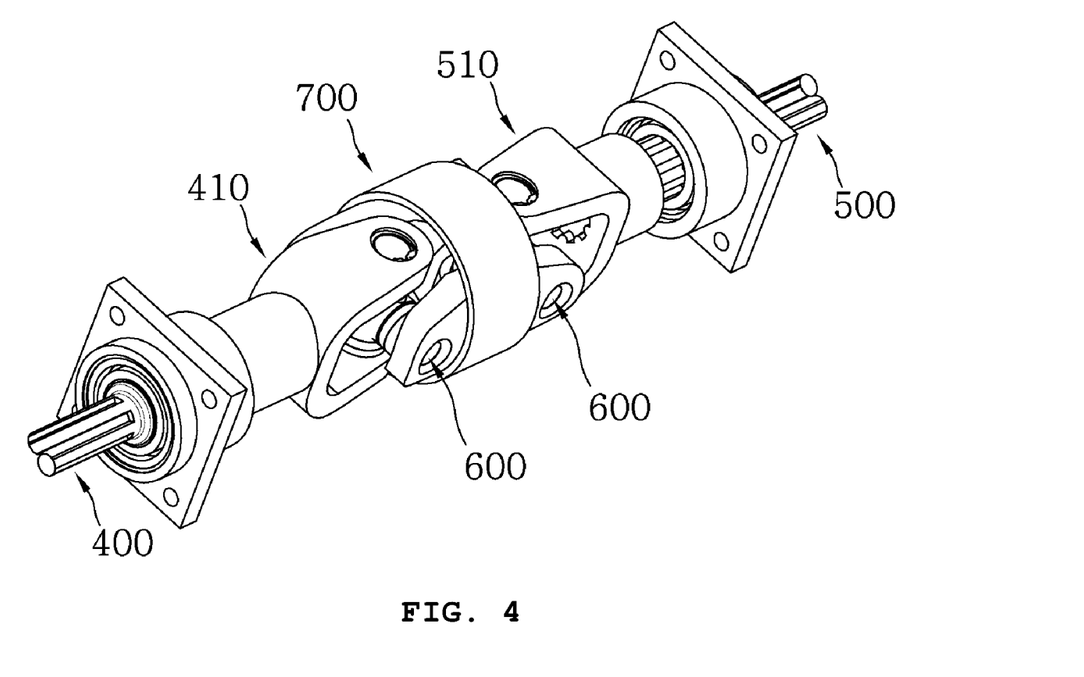
FIG. 4 is a perspective view illustrating a power transmission device in a connection device for an agricultural machine of the present invention.

As shown in FIG. 3, a general basic structure of the connection device for the agricultural machine is configured to include: a front body 100 positioned on the tractor side; a rear body 200 positioned on the agricultural machine side; a joint part 300 provided to allow each of the bodies to be coupled and rotatable via center pins 310 installed on the central parts of the upper and lower tip ends of each of the bodies; an input shaft 400 having an input yoke 410 provided at a tip end thereof, wherein, passing through one side of the front body, the tip end is disposed to be positioned inside the front body; an output shaft 500 having an output yoke 510 provided at a tip end thereof, wherein, passing through one side of the rear body, the tip end is disposed to be positioned inside the rear body; and a connection yoke 700 disposed between each of the yokes and formed to allow each of the yokes to be connected and installed thereto via cross-shaped bearings 600.

Since the above structure is a general configuration, a detailed description thereof will be omitted. Hereinafter, the configuration for enlarging the rotation angle of the connection device, that is, the input and output yokes 410 and 510 and thus the rotation angle of the front body 100 and the rear body 200, which is a feature of the present invention, will be described with reference to FIGS. 4 to 9.

Figure 8A:
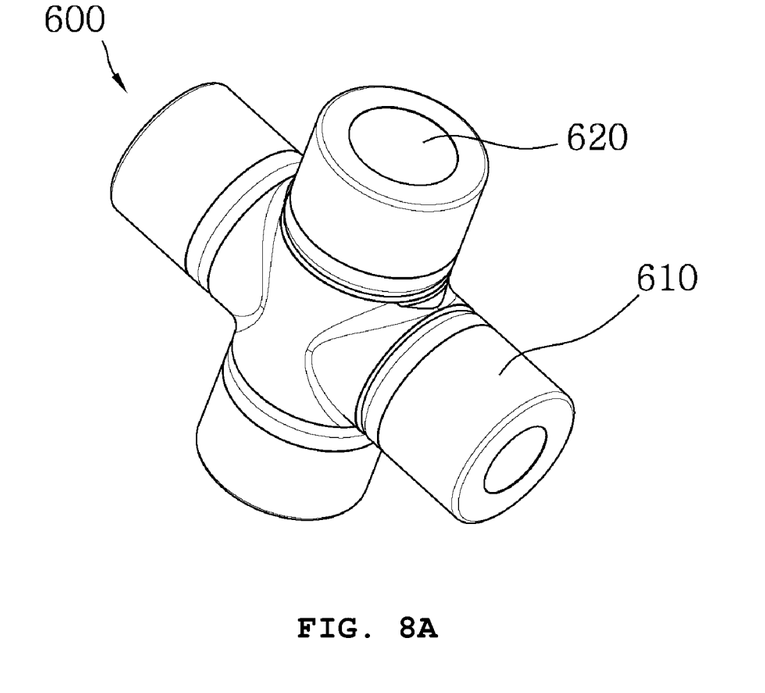
FIGS. 8a and 8b are a perspective view and a front view illustrating a cross-shaped bearing of the present invention.
Figure 8B:
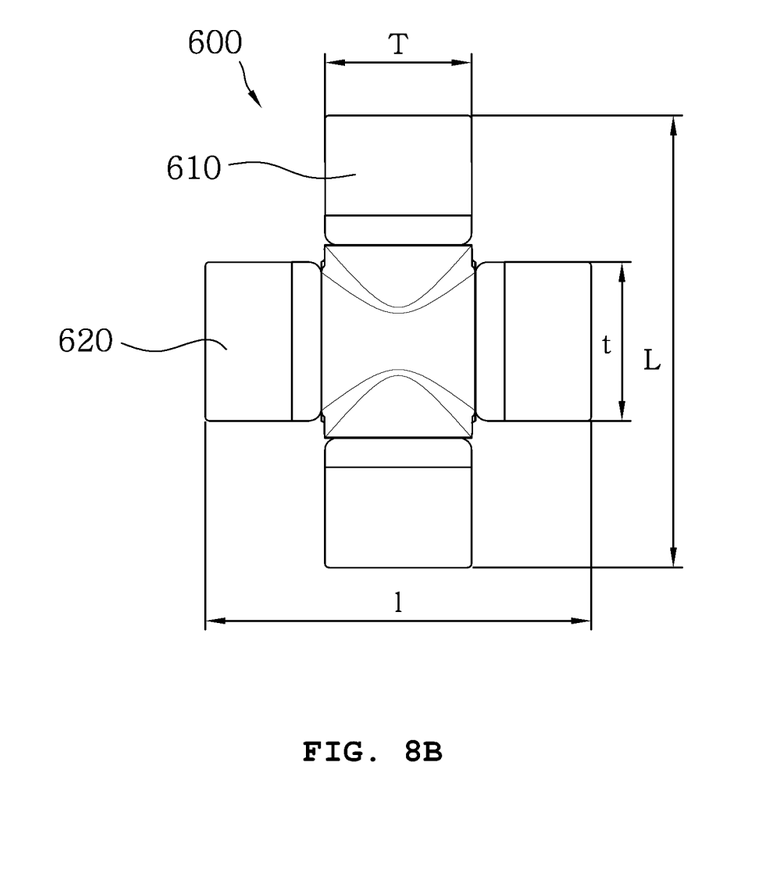

In the cross-shaped bearing 600 of the present invention, the length L of the connection yoke fastening shafts 610 fastened to the connection yoke 700 is longer than the length 1 of the input and output connection yoke fastening shafts 620 fastened to the input and output yokes 410 and 510 as illustrated in FIG. 8b.

Figure 7:
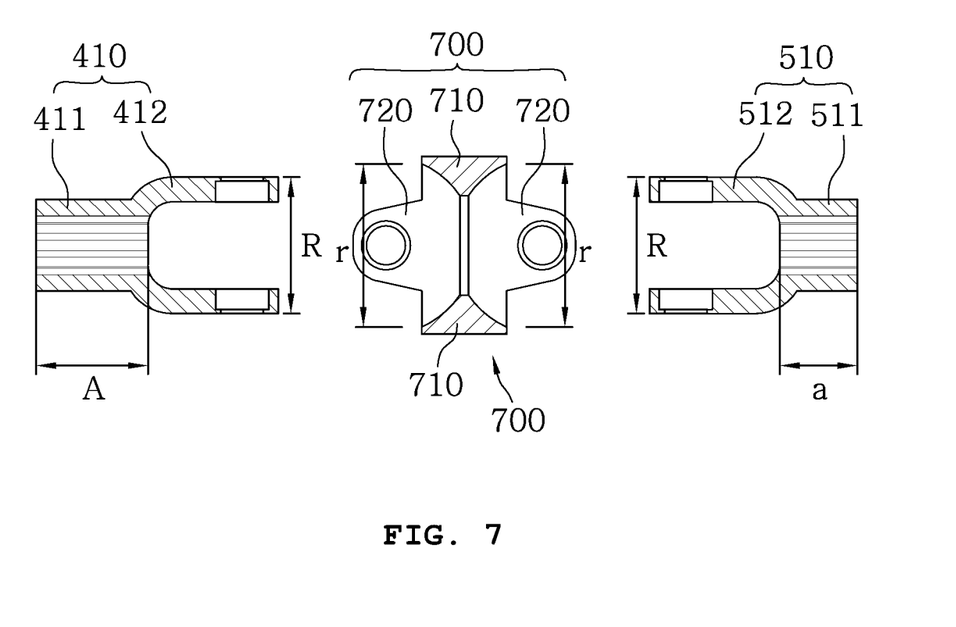
FIG. 7 shows an exploded cross sectional views illustrating a power transmission device in a connection device for an agricultural machine of the present invention.

In addition, the outer diameter R of the tip end of each of the input and output yokes 410 and 510 is smaller than the inner diameter r of an entrance of the connection yoke 700 as illustrated in FIG. 7, whereby, when the input and output yokes 410 and 510 are rotated, a part of the tip end of each of the input and output yokes 410 and 510 can be easily rotated without friction in a state of being accommodated in the inner side of the entrance of the connection yoke 700 and.

Figure 6:
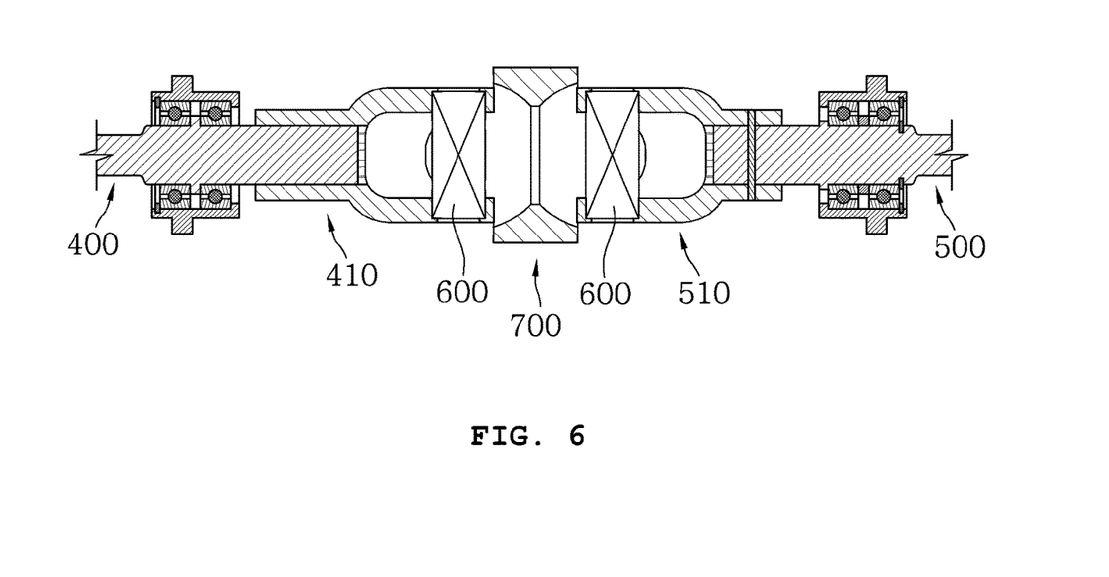
FIG. 6 is a coupled cross sectional view illustrating a power transmission device in a connection device for an agricultural machine of the present invention.

The reason why the length L of the connection yoke fastening shaft 610 to be coupled to the connection yoke 700 is longer than the length 1 of the input and output yoke fastening shafts 620 to be coupled to the input and output yokes 410 and 510 is as follows. That is, when the input and output yokes 410 and 510 in a state of being connected to the connection yoke 700 via cross-shaped bearings 600 are rotated, the part of the tip end of each of the input and output yokes 410 and 510 is rotated in a state of being accommodated in the inner side of the entrance of the connection yoke 700 as illustrated in FIG. 6. Accordingly, the rotation angle of the input and output yokes 410 and 510 is enlarged by increasing the amount of rotation of the input and output yokes 410 and 510, whereby the rotation angle of the front and rear bodies 100 and 200, is enlarged (75 degree angles or less at each of both sides with a center line as a reference). (See FIG. 9.)

When the rotation angle of the front and rear bodies 100 and 200 is enlarged as described above, the agricultural machine connected to the connection device of the present invention can work the corners of rice paddies or fields to minimize the unfinished remaining portions of rice paddies or fields. Accordingly, it has the advantage of minimizing the amount of work that is required to be manually performed later.

Meanwhile, a part of the tip end of each of the input and output yokes 410 and 510 is rotated in a state of being accommodated in the inner sides of the entrance, respectively, of the connection yoke 700, thereby allowing the rotation angle to be enlarged (75 degree angles or less at each of both sides with a center line as a reference). It is possible to achieve as described above, because, in the cross-shaped bearing 600, the length L of the connection yoke fastening shaft 610 fastened to the connection yoke 700 is formed to be longer than the length 1 of each of the input and output connection yoke fastening shafts 620 fastened to the input and output yokes 410 and 510, and the outer diameter R of the tip end of each of the input and output yokes 410 and 510 is formed smaller than the inner diameter r of the entrance of the connection yoke 700.

The reason why the rotation angle of the input and output yokes 410 and 510 in the present invention is larger than the rotation angle of the input and output yokes 410 and 510 in conventional art will be described with reference to FIGS. 11 and 12.

Figure 11:
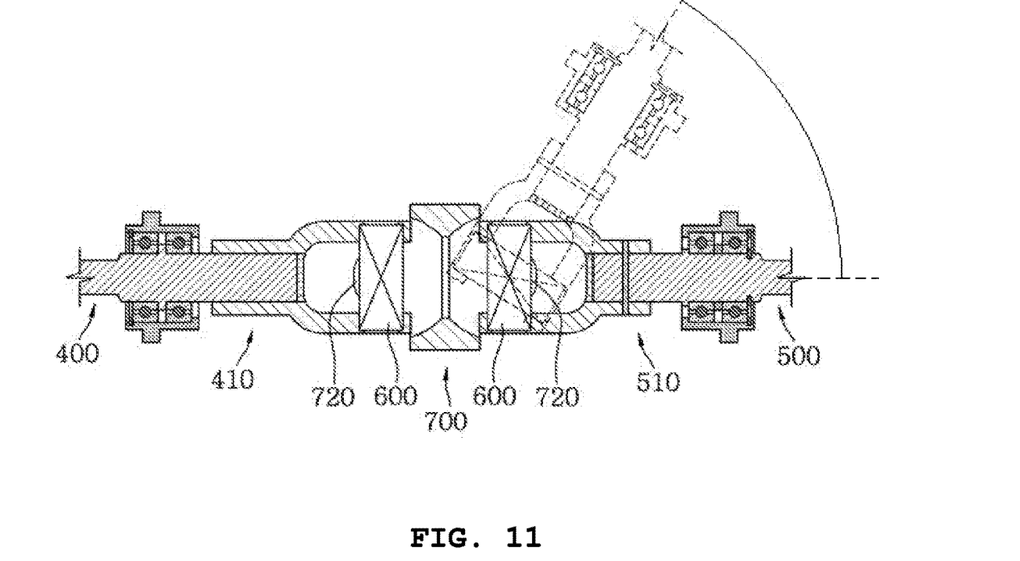
FIG. 11 is an operational cross sectional view for explaining the difference between rotation angles of input and output yokes of the present invention.
Figure 12:
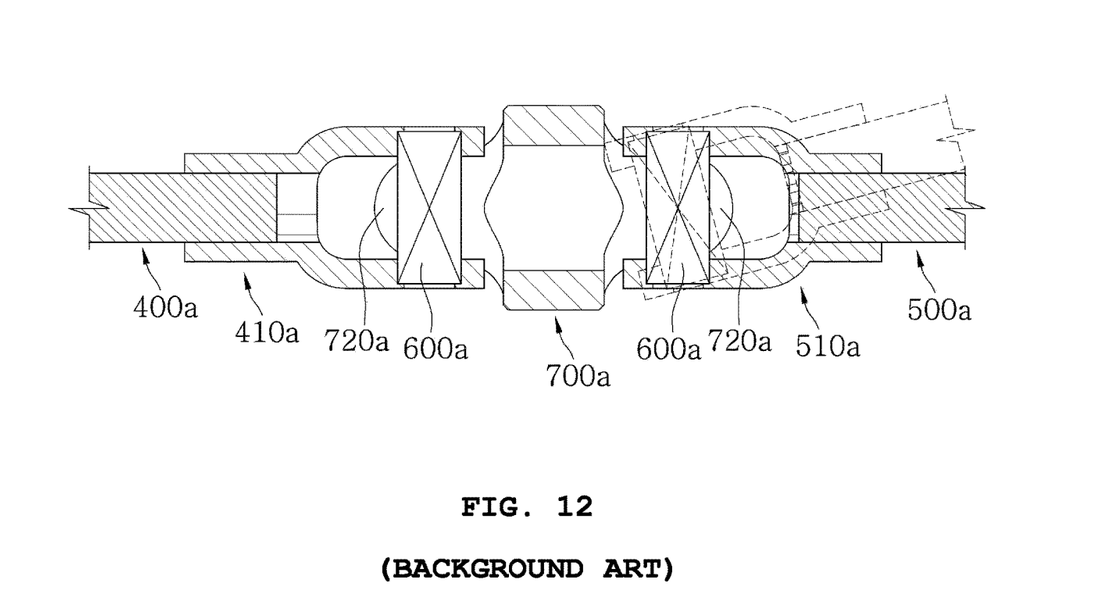
FIG. 12 is an operational cross sectional view for explaining the difference between rotation angles of input and output yokes of the conventional art.

FIG. 11 is a view illustrating an embodiment of the present invention, and FIG. 12 is a view illustrating an embodiment of the conventional art.

To describe the FIG. 11 first, because the outer diameter R of the tip end of each of the input and output yokes 410 and 510 is formed smaller than the inner diameter r of the entrance of the connection yoke 700, as the input and output yokes 410 and 510 are rotated, a part of the tip end of each thereof is rotated in a state of being accommodated inside the connection yoke 700, whereby the amount of rotation of the input and output yokes 410 and 510 increases accordingly and the rotation angle thereof increases correspondingly.

However, in a conventional art as illustrated in FIG. 12, because the outer diameter of the tip end of each of the input and output yokes 410a and 510a and the inner diameter of the entrance of the connection yoke 700a have sizes substantially equal to each other, the input and output yokes 410a and 510a cannot be accommodated inside the connection yoke 700a while being rotated, whereby the tip ends of each of the input and output yokes 410a and 510a and each of the opposite end portions of the connection yoke 700a become to bring into contact with each other correspondingly early in a state where only a small amount of rotation thereof is made. Accordingly, the rotation thereof stops at the time of the contact thereof, whereby the amount of rotation thereof decreases accordingly and the rotation angle thereof becomes narrow correspondingly.

Meanwhile, since the connection yoke 700 of the present invention is formed with a ring portion 710 at the center thereof, and a pair of fastening holes 720 integrally formed with the ring portion 710 are protrudingly formed on opposite sides of the ring portion 710 so as to face each other, the inner circumferential surface of the ring portion 710 is formed such that the inner diameters thereof gradually become smaller from the entrance toward the central portion of the inner side thereof as illustrated in FIG. 7. Accordingly, when the input and output yokes 410 and 510 are rotated, each of the tip ends of the input and output yokes 410 and 510 does not generate the friction inside the ring portion 710 of the connection yoke 700, whereby the rotation of the input and output yokes 410 and 510 is smoothly performed.

Figure 5:
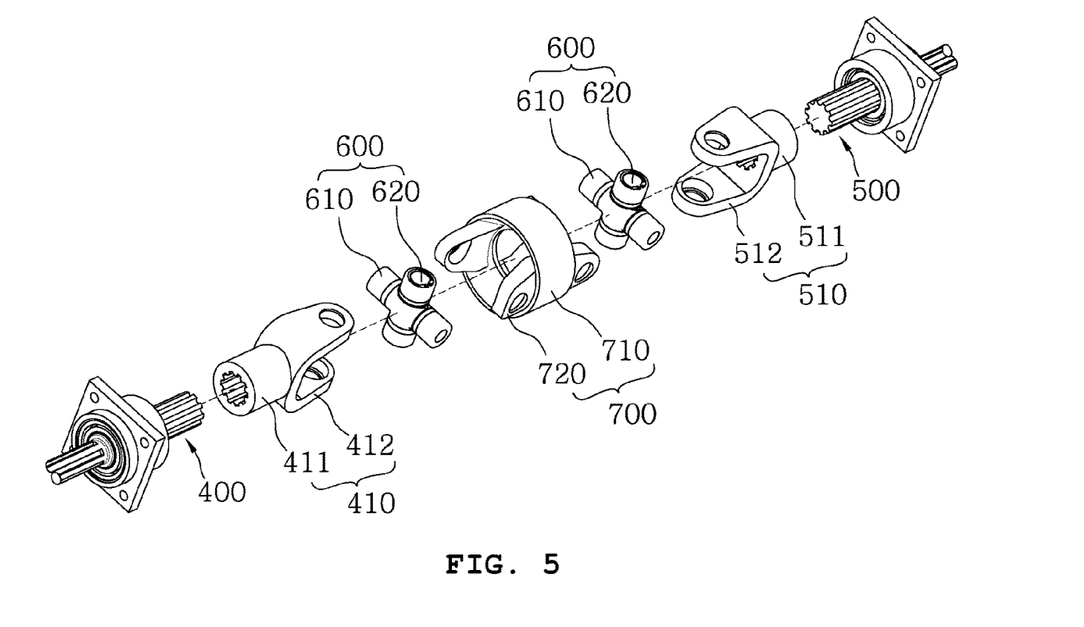
FIG. 5 is an exploded perspective view illustrating a power transmission device in a connection device for an agricultural machine of the present invention.

In the present invention, as illustrated in FIG. 5, a pair of input yoke shaft fastening portions 412 fastening the input yoke fastening shaft 620 thereto are formed to face each other in a forward direction of the input yoke 410, and an input shaft coupling portion 411 having a spline gear formed on an inner circumferential surface thereof in a rearward direction of the input yoke 410 so as to be coupled with an input shaft 400 having a spline gear formed thereon in a forward direction thereof.

In addition, a pair of output yoke shaft fastening portions 512 fastening the output yoke fastening shaft 620 thereto are formed to face each other in a forward direction of the output yoke 510, and an output shaft coupling portion 511 having a spline gear formed on an inner circumferential surface thereof in a rearward direction of the output yoke 510 so as to be coupled with an output shaft 500 having a spline gear formed thereon in a forward direction thereof. Accordingly, when the input and output shafts 400 and 500 are coupled with the input and output shaft coupling portions 411 and 511, respectively, then the connection device is allowed to move backward and forward.

On the other hand, in place of the spline gears formed in the input and output shafts 400 and 500 and the input and output shaft coupling parts 411 and 511, each of the front portions of the input and output shafts 400 and 500 may be formed into a polygonal shape having four or more sides, and the input and output shaft coupling units 411 and 511 may be formed with polygonal shaft coupling units corresponding to the respective sides of the polygonal shape.

Meanwhile, the length A of the input shaft coupling unit 411 formed in a rearward direction of the input yoke 410 is formed longer than the length a of the output shaft coupling unit 511 formed in a rearward direction of the output yoke 510 as illustrated in FIG. 7. The reason for the above is that the distance between the tractor and the connection device or between the connection device and the agricultural machine varies slightly according to the rotation of the front body 100 and the rear body 200, that is, the rotation of the input and output yokes 410 and 510. In this case, the input and output shafts 400 and 500 move backward and forward inside the input and output shaft coupling units 411 and 511, respectively, thereby allowing a distance variation to be compensated.

Meanwhile, it is preferable that the input shaft 400 is coupled with the input shaft coupling unit 411 and is not fixed after being coupled therewith, thereby allowing the input shaft 400 to move backward and forward inside the input shaft coupling unit 411, and the output shaft 500 may be coupled with the output shaft coupling unit 511 and fixed with a fixing piece, thereby not allowing the output shaft 500 to move backward and forward inside the output shaft coupling unit 511.

The reason for the above is that because the direction change, that is, rotation is mainly performed in the tractor, thereby rotating the input yoke 410 through the input shaft 400, the distance between the tractor and the input yoke 410 is changed. Accordingly, a distance variation induced by the change should be compensated. Meanwhile, the agricultural machine connected to the output shaft 500 connected to the output yoke 510 is pulled by the tractor and thus a distance between the output yoke 510 and the agricultural machine does not change. Accordingly, the output yoke 510 and the output shaft 500 may be fixed.

Figure 9:
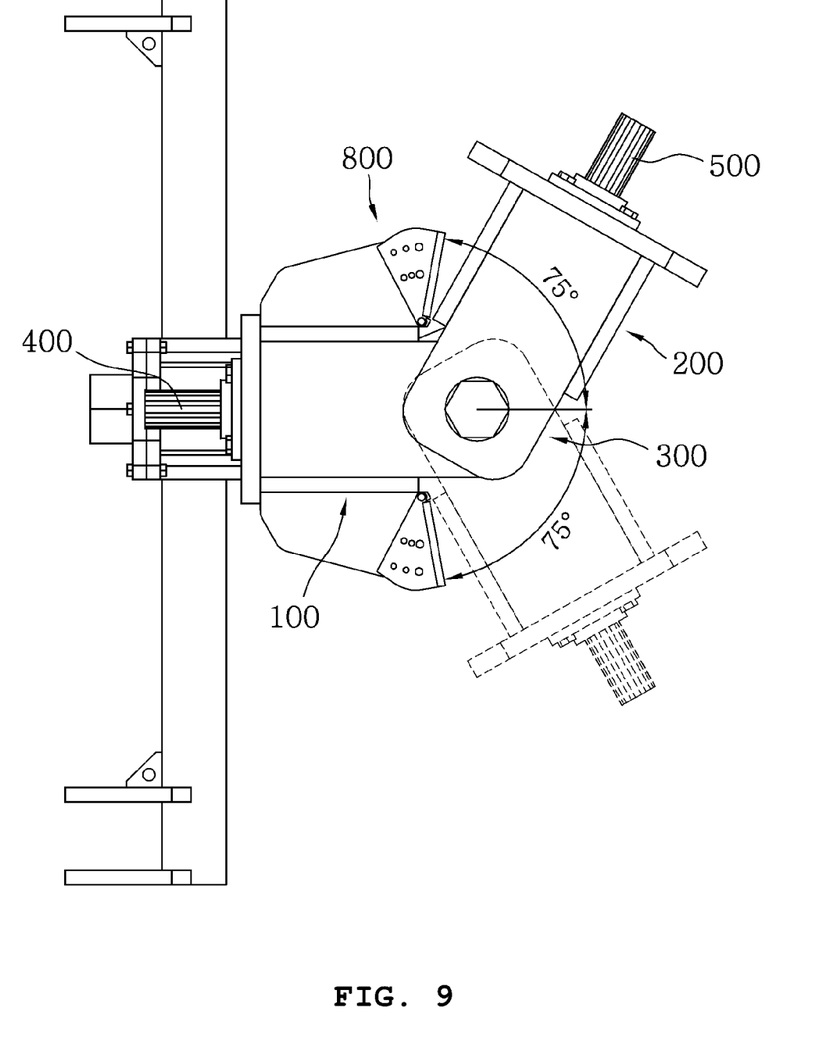
FIG. 9 is a schematic plan view for explaining a rotation angle of a connection device for an agricultural machine of the present invention.

The maximum rotation angle of the front body 100 and the rear body 200 with respect to the rotation of the input and output yokes 410 and 510 is preferably 75 degree angles or less with the center line as a reference as shown in FIG. 9. The reason for this is that when the angle is larger than 75 degree angles, there is a problem such that the power transmission of the tractor cannot be smoothly performed to the agricultural machine through the connection device of the present invention.

Figure 10:
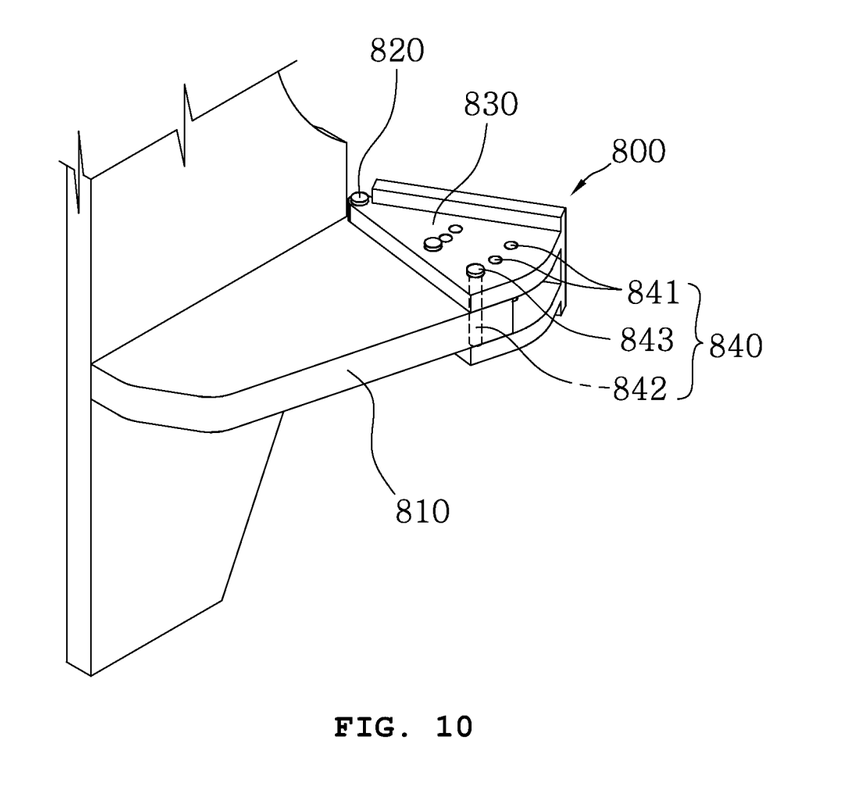
FIG. 10 is an excerpted perspective view for explaining a rotation angle adjusting means in a connection device for an agricultural machine of the present invention.

In addition, as illustrated in FIGS. 3 and 10, a rotation angle adjusting means 800 for adjusting the body rotation angle of the other side is installed on opposite end parts of the lower portion of either one of the front and rear bodies 100 and 200. Accordingly, the rotation angle of the front body 100 and the rear body 200 is allowed to be adjusted within a desired angle range.

The rotation angle adjusting means 800 is configured to include: a stopper 810 installed at each of opposite sides of the lower portion of either one of the front and rear bodies 100 and 200; a rotating body 830 installed at a tip end of the stopper 810 and rotated via a hinge axle 820 installed at an innermost side thereof; and a fixing means 840 provided at the stopper 810 and the rotating body 830 and fixing a position of the rotating body 830.

Here, it is preferable that the shape of the rotating body 830 is a C-shape in which a part of the front end of the stopper 810 is accommodated. However, any rotating body in other shape capable of adjusting the distance between the stopper 810 and the rotating body 830 is also possible.

Meanwhile, Meanwhile, the fixing means 840 is configured to include: through holes 841 formed at regular intervals in any one of the rotating body 830 and the stopper 810; coupling holes 842 formed to be corresponding to the through holes 841 in the remaining one of the rotating body 830 and the stopper 810; and fixing members 843 passing through the through holes and coupling holes correspondingly as necessary and provided at a position adjacent to the through holes and coupling holes.

In addition, the fixing means 840 may be formed in a plurality of rows to provide firmness.

In addition, in the cross-shaped bearing 600, an outer diameter t of the input and output yoke fastening shafts 620 fastened to the respective input and output yokes 410 and 510 is formed to be larger than an outer diameter T of the coupling yoke fastening shafts 610 fastened to the connection yoke 700 as illustrated in FIG. 8b, and the reason therefor is as follows.

Rotation of the input and output yokes 410 and 510 for transmitting and receiving power from and to the input and output shafts 400 and 500 correspondingly and an angle change in a state where the input and output yokes 410 and 510 and the connection yoke 700 are coupled with each other are sometimes performed. In this case, the input and output yoke fastening shafts 620 are more loaded.

Accordingly, the outer diameter t of the input and output yoke fastening shafts 620 fastened to the input and output yokes 410 and 510 should be larger than the outer diameter T of the coupling yoke fastening shafts 610, thereby allowing the input and output yoke fastening shafts 620 to withstand the load.

The connection device for the agricultural machine of the present invention as described above can enlarge the magnitude of the rotation angle of the connection device connecting the tractor and the agricultural machine to make the tractor and the agricultural machine easier to enter into and exit from the arable land from and to a road, respectively, as well as to allow even a corner of a rice paddy or field (arable land) to be worked, thereby minimizing the remaining portion to be worked by manpower. In addition, it is possible to allow the power of the tractor to be smoothly transmitted to the agricultural machine even when the rotation angle of the connection device is enlarged as well as to allow the tractor to pull up the agricultural machine smoothly even when the rotation angle of the connection device is enlarged and, at the same time, to enhance the durability thereof.

What is claimed is:

1. A connection device for an agricultural machine, the device comprising:
    a front body having an input shaft coupled with an input yoke and installed passing therethrough;
    a rear body having an output shaft coupled with an output yoke and installed passing therethrough;
    a joint part provided to allow each of the bodies to be coupled with each other and to be rotatable via center pins installed on central parts of upper and lower tip ends of each of the bodies; and
    a connection yoke fastening each of the input and output yokes thereto via cross-shaped bearings, each of the cross-shaped bearings including a connection yoke fastening shaft and an input and output connection yoke fastening shaft, wherein,
    in the cross-shaped bearings, a length (L) of the connection yoke fastening shafts fastened to the connection yoke is formed to be longer than the length (l) of the input and output connection yoke fastening shafts fastened to the input and output yokes, and an outer diameter (R) of a tip end of each of the input and output yokes is formed to be smaller than an inner diameter (r) of an entrance of the connection yoke, whereby, when each of the input and output yokes rotates, a part of the tip end of each of the input and output yokes can be rotated without friction in a state of being accommodated in an inner side of the entrance of the connection yoke and, at the same time, a maximum rotation angle of the input and output yokes is thereby enlarged.

2. The device of claim 1, wherein the connection yoke is formed with a ring portion at a center thereof, and a pair of fastening holes integrally formed with the ring portion are protrudingly formed on each of opposite sides, of the ring portion so as to face each other, wherein an inner circumferential surface of the ring portion is formed such that the inner diameter thereof gradually becomes smaller from the entrance toward the central portion of the inner side thereof.

3. The device of claim 1, wherein;
    a pair of input yoke shaft fastening portions fastening the input yoke fastening shaft thereto are formed to face each other in a forward direction of the input yoke, and an input shaft coupling portion having a spline gear formed on an inner circumferential surface thereof in a rearward direction of the input yoke so as to be coupled with an input shaft having a spline gear formed thereon in a forward direction thereof, and
    a pair of output yoke shaft fastening portions fastening the output yoke fastening shaft thereto are formed to face each other in a forward direction of the output yoke, and an output shaft coupling portion having a spline gear formed on an inner circumferential surface thereof in a rearward direction of the output yoke so as to be coupled with an output shaft having a spline gear formed thereon in a forward direction thereof.

4. The device of claim 3, wherein a length (A) of the input shaft coupling unit formed in a rearward direction of the input yoke is formed longer than a length (a) of the output shaft coupling unit formed in a rearward direction of the output yoke.

5. The device of claim 1, wherein the maximum rotation angle is 75 degrees to either left or right of a reference center line.

6. The device of claim 1, wherein a rotation angle adjusting means for adjusting the maximum rotation angle of the other side is installed on opposite end parts of a lower portion of either one of the front and rear bodies.

7. The device of claim 6, wherein the rotation angle adjusting means is configured to include:
    a stopper installed at each of opposite sides of the lower portion of either one of the front and rear bodies;
    a rotating body installed at a tip end of the stopper and rotated via a hinge axle installed at an innermost side thereof; and
    a fixing means provided at the stopper and the rotating body and fixing a position of the rotating body.

8. The device of claim 7, wherein the fixing means is configured to include:
    through holes formed at regular intervals in any one of the rotating body and the stopper;
    coupling holes formed to be corresponding to the through holes in the remaining one of the rotating body and the stopper; and
    fixing members passing through the through holes and coupling holes correspondingly as necessary and provided at a position adjacent to the through holes and coupling holes.

9. The device of claim 8, wherein the fixing means is formed in a plurality.

10. The device of claim 1, wherein, in the cross-shaped bearing, an outer diameter (t) of the input and output yoke fastening shafts fastened to the respective input and output yokes is formed to be larger than an outer diameter (T) of the coupling yoke fastening shafts fastened to the connection yoke.

* * * * *